US012663406B2

(12) United States Patent
Horn

(10) Patent No.: US 12,663,406 B2
(45) Date of Patent: Jun. 23, 2026

(54) DEVICE AND METHOD FOR DETERMINATION OF A CATALYST STATE IN A CHEMICAL REACTOR

(71) Applicant: REACNOSTICS GMBH, Hamburg (DE)

(72) Inventor: Raimund Horn, Jesteburg (DE)

(73) Assignee: REACNOSTICS GMBH, Hamburg (DE)

( * ) Notice: Subject to any disclaimer, the term of this patent is extended or adjusted under 35 U.S.C. 154(b) by 1005 days.

(21) Appl. No.: 17/770,846

(22) PCT Filed: Oct. 21, 2020

(86) PCT No.: PCT/EP2020/079663
§ 371 (c)(1),
(2) Date: Apr. 21, 2022

(87) PCT Pub. No.: WO2021/078817
PCT Pub. Date: Apr. 29, 2021

(65) Prior Publication Data
US 2022/0373524 A1 Nov. 24, 2022

(30) Foreign Application Priority Data
Oct. 21, 2019 (DE) .......................... 102019128398.1

(51) Int. Cl.
*B01L 3/00* (2006.01)
*B01D 15/08* (2006.01)
(Continued)

(52) U.S. Cl.
CPC .............. *G01N 31/10* (2013.01); *B01J 8/001* (2013.01); *B01J 8/0278* (2013.01); *B01J 8/0285* (2013.01);
(Continued)

(58) Field of Classification Search
CPC ........ G01N 31/10; G01N 21/05; G01N 21/35; G01N 2021/0325; G01N 2021/752;
(Continued)

(56) References Cited

U.S. PATENT DOCUMENTS 5,911,953 A * 6/1999 Ogata ................ G01N 21/3563
436/155
6,269,144 B1 * 7/2001 Dube ..................... G01N 23/20
378/71
(Continued)

FOREIGN PATENT DOCUMENTS

CN 106370770 A 2/2017
WO WO-9921649 A1 * 5/1999 ........... B01D 53/228
(Continued)

OTHER PUBLICATIONS

Thomas, Sébastien, et al. "Modelling a reactor cell for operando IR studies: From qualitative to fully quantitative kinetic investigations." Catalysis Today 283 (2017): 176-184. (Year: 2017).*

(Continued)

*Primary Examiner* — Jennifer Wecker
*Assistant Examiner* — Oyeleye Alexander Alabi
(74) *Attorney, Agent, or Firm* — MARSHALL, GERSTEIN & BORUN LLP

(57) ABSTRACT

The invention pertains to a device for determination of a catalyst state in a chemical reactor and to a method for detecting a catalyst state under in situ reaction conditions. A reactor is provided with a solid catalyst provided in a reactor chamber. A fluid sample is taken from the reactor chamber and is transferred to a sample chamber. The temperature at the extraction site of the sample in the reactor chamber is determined and the temperature of the sample chamber is adjusted to the same temperature. A small amount of the catalyst provided in reactor chamber is provided in sample (Continued)

chamber and is contacted with the sample flow. Spectroscopic information is then obtained on the catalyst provided in sample cell, e.g. by an IR spectrometer.

13 Claims, 2 Drawing Sheets

(51) Int. Cl.

| | |
|---|---|
| B01F 33/302 | (2022.01) |
| B01F 33/3033 | (2022.01) |
| B01J 8/00 | (2006.01) |
| B01J 8/02 | (2006.01) |
| B01L 7/00 | (2006.01) |
| B01L 9/00 | (2006.01) |
| B65G 47/80 | (2006.01) |
| B82Y 20/00 | (2011.01) |
| B82Y 30/00 | (2011.01) |
| B82Y 40/00 | (2011.01) |
| C12M 1/34 | (2006.01) |
| C12M 3/06 | (2006.01) |
| C12N 1/14 | (2026.01) |
| C12N 1/20 | (2026.01) |
| C12Q 1/02 | (2006.01) |
| C12Q 1/6806 | (2018.01) |
| C12Q 1/6844 | (2018.01) |
| C12Q 1/6848 | (2018.01) |
| C12Q 1/686 | (2018.01) |
| G01N 15/10 | (2024.01) |
| G01N 15/14 | (2024.01) |
| G01N 15/1433 | (2024.01) |
| G01N 21/05 | (2006.01) |
| G01N 21/29 | (2006.01) |
| G01N 21/35 | (2014.01) |
| G01N 21/65 | (2006.01) |
| G01N 30/02 | (2006.01) |
| G01N 30/72 | (2006.01) |
| G01N 31/10 | (2006.01) |
| G01N 33/543 | (2006.01) |
| G01N 33/557 | (2006.01) |
| G01N 33/574 | (2006.01) |
| G01N 33/58 | (2006.01) |
| G01N 21/03 | (2006.01) |
| G01N 21/75 | (2006.01) |

(52) U.S. Cl.
    CPC ............. *G01N 21/05* (2013.01); *G01N 21/35* (2013.01); *B01J 2208/00053* (2013.01); *B01J 2208/00964* (2013.01); *B01J 2219/00186* (2013.01); *G01N 2021/0325* (2013.01); *G01N 2021/752* (2013.01)

(58) Field of Classification Search
    CPC .............. G01N 21/272; G01N 21/359; G01N 21/3563; B01J 8/001; B01J 8/0278; B01J 8/0285; B01J 2208/00053; B01J 2208/00964; B01J 2219/00186; B01J 2208/00628; B01J 2208/00955
    See application file for complete search history.

(56)                 References Cited

U.S. PATENT DOCUMENTS

| | | | | |
|---|---|---|---|---|
| 2003/0125884 A1* | 7/2003 | Linsen | ............... | G01N 35/0092 |
| | | | | 702/22 |
| 2004/0077094 A1 | 4/2004 | Akporiaye et al. | | |
| 2010/0320121 A1 | 12/2010 | Bauman et al. | | |
| 2011/0045596 A1* | 2/2011 | Ducreux | ................ | G01N 31/10 |
| | | | | 422/68.1 |
| 2012/0287418 A1* | 11/2012 | Scherer | .................. | G01N 21/39 |
| | | | | 356/51 |
| 2012/0309101 A1* | 12/2012 | Horn | .................. | G01N 21/8507 |
| | | | | 436/164 |
| 2016/0176797 A1* | 6/2016 | Brueggemann | ........ | B01J 27/198 |
| | | | | 562/599 |
| 2019/0187059 A1 | 6/2019 | Horn et al. | | |
| 2022/0268670 A1* | 8/2022 | Horn | ........................ | G01N 1/16 |

FOREIGN PATENT DOCUMENTS

| | | | | |
|---|---|---|---|---|
| WO | WO-2011/072701 A1 | 6/2011 | | |
| WO | WO-2018033523 A1 * | 2/2018 | ......... | G01N 21/0332 |

OTHER PUBLICATIONS

Horn, Raimund, et al. "Syngas by catalytic partial oxidation of methane on rhodium: Mechanistic conclusions from spatially resolved measurements and numerical simulations." Journal of Catalysis 242.1 (2006): 92-102. (Year: 2006).*

Mitchell, Mark B. "Fundamentals and applications of diffuse reflectance infrared fourier transform (DRIFT) spectroscopy." (1993): 351-375. (Year: 1993).*

International Search Report issued in PCT Patent Application No. PCT/EP2020/079663 mailed on Feb. 15, 2021.

Written Opinion issued in PCT Patent Application No. PCT/EP2020/079663 mailed on Feb. 15, 2021.

Horn, R. et al., "Syngas by catalytic partial oxidation of methane on rhodium: Mechanistic conclusions from spatially resolved measurements and numerical simulations," *Journal of Catalysis*, vol. 242, No. 1 pp. 92-102 (2006).

* cited by examiner

DEVICE AND METHOD FOR DETERMINATION OF A CATALYST STATE IN A CHEMICAL REACTOR

TECHNICAL FIELD

The invention pertains to a device for determination of a catalyst state in a chemical reactor. The invention further pertains to a method for determination of a catalyst state in a chemical reactor.

BACKGROUND

Reactor measurements are central to heterogeneous catalysis research. Apart from reactors which feature a number of discrete sampling points, typically less than ten, all reactor designs have in common that reaction products are analyzed in the reactor effluent stream be it gaseous or liquid. The reaction pathway, i.e. how the reactants are transformed into products remains hidden and only a single kinetic data point is obtained for a set of reaction variables. In addition to kinetic information, heterogeneous catalysts are often characterized spectroscopically to investigate their geometric and electronic structure, surface species and active sites. As a catalyst is a dynamic system and adapts to its chemical environment, in situ spectroscopic techniques become more and more important in heterogeneous catalysis research. These techniques aim at bridging the material and pressure gap by studying polycrystalline powders or supported catalysts under working reaction conditions.

In WO 2011/072701 is described a reactor comprising a reactor chamber and a sensor situated inside the reactor chamber. The sensor is a sensor for collecting spectroscopic information. The reactor comprises a sampling capillary which traverses the reactor chamber and can be shifted in a longitudinal direction. In the sidewall of the sampling capillary is provided a sampling orifice. Fluid phase passing through the reactor chamber can enter the interior space of the sampling capillary through the sampling orifice. A fluid sample can be extracted from the reactor chamber and be transported through the sampling capillary to an analytical instrument for further analysis. Such analytical instrument is e.g. a gas chromatograph (GC) or an instrument for high performance liquid chromatography (HPLC). Further information on the components of the fluid sample can be obtained e.g. by mass spectroscopy. The sampling capillary is made of a material transparent to radiation, in particular transparent to visible light. Suitable materials for the sampling capillary are e.g. glass or quartz.

Inside the sampling capillary is arranged a transparent fiber with the fiber tip arranged at the sampling orifice. The transparent fiber can be made of e.g. glass or quartz. Light, e.g. laser light, is guided through the transparent fiber to exit the fiber at the fiber tip. The fiber tip has a conical shape such that the light exits the fiber at an angle and is guided onto the surface of catalyst particles arranged inside the reactor chamber. The incident light is scattered at the catalyst surface and the scattered light is then collected again at the tip of the transparent fiber. The light is then guided to a suitable analytic device for analysis of the scattered radiation. Information on the catalyst can then be obtained e.g. by Raman spectroscopy.

Further, a temperature-sensitive fiber is arranged inside the sampling capillary with the tip of the temperature-sensitive fiber being arranged at the sampling orifice. The temperature of the fluid phase at the sampling orifice can then be determined.

The reactor allows to obtain spatial profiles from the interior of a reactor chamber by shifting the sampling capillary with the transparent fiber for obtaining spectroscopic data and the temperature sensitive fiber situated inside the sampling capillary.

In WO 2018/033523 is described a system for operando measurements comprising:

- a reactor comprising a reactor chamber having at least one window transparent (transmissive) for radiation for irradiating a sample provided inside the reactor chamber,
- a radiation source for generating the radiation for irradiating the sample, wherein the radiation source is arranged to irradiate the sample at an irradiation location situated on the sample;
- a detection unit for detecting radiation scattered, emitted, reflected or diffracted by the sample or transmitted through said sample,
- a sampling capillary comprising an orifice for collecting a fluid sample inside the reactor chamber, wherein the orifice of the sampling capillary is arranged at a fixed position relative to the irradiation location,
- wherein the reactor is movable relative to the radiation source.

In the system for operando measurements the radiation source, e.g. a laser, is kept at a fixed position and the reactor is moved along a longitudinal direction. The reactor comprises a transparent window, such that radiation emitted by the radiation source, e.g. a laser, can enter into the reactor chamber. The radiation interacts with a surface of a catalyst provided in the reactor chamber to be e.g. scattered on the catalyst surface. The scattered radiation passes the transparent window to leave the reactor chamber. On the outside of the reactor chamber is situated a detection unit for collecting scattered radiation emitted from the reactor chamber through the window.

The system for operando measurements allows to significantly reduce the amount of catalyst needed for analysis since the size of the reactor chamber can be reduced in comparison to the reactor described in WO 2011/072701. Further, the radiation used for spectroscopic analysis only has to pass a window provided in the reactor chamber but has not to be guided through a fiber. The analysis results, i.e. the spectroscopic data therefore do comprise less noise than spectroscopic data obtained with the reactor of WO 2011/072701.

In both devices described above radiation has to pass a transparent material before impinging onto the surface of a probe sample, e.g. the surface of a catalyst particle. In the reactor described in WO 2011/072701 a transparent fiber is used to guide radiation from a radiation source to a site on a catalyst surface wherein the radiation further has to pass the wall of the sampling capillary. In the system for operando measurements described in WO 2018/033523 the radiation has to pass a transparent widow before impinging onto a sample surface provided in the interior of the reactor chamber.

Whereas for visible light and light in the UV-range transparent materials are available at reasonable costs, e.g. glass or quartz, the situation becomes significantly more difficult when using radiation with a wavelength outside the visible/UV range. This is for example the case for infrared radiation and for X-rays. Quite a lot of such materials cannot be formed e.g. to a capillary as needed in the reactor described in WO 2011/072701.

SUMMARY OF THE DISCLOSURE

The problem underlying the invention therefore is to provide a device for determination of a catalyst state in a chemical reactor and a method for detecting a catalyst state under in situ reaction conditions that allows a broad application of spectroscopic methods.

The problem is solved by a device for determination of a catalyst state in a chemical reactor according to claim 1. Preferred embodiments are defined in the depending claims.

The device for determination of a catalyst state in a chemical reactor according to the invention is comprising:
- a reactor comprising a reactor chamber with at least one inlet for introducing a fluid phase into the reactor chamber and at least one outlet for draining off the fluid phase,
- a sampling device for collecting a fluid sample inside the reactor chamber at a sampling site,
- a temperature-sensitive sensor arranged at the sampling site of the sampling device for detecting a temperature of a fluid phase and/or a solid phase at the sampling site of the sampling device where the fluid sample is collected,
- According to the invention the device for determination of a catalyst state in a chemical reactor further comprises:
- a spectroscopic detection unit arranged outside the reactor, said spectroscopic unit comprising a sample chamber for arranging a sample therein and a spectroscopic analysis device for obtaining spectroscopic data on the sample arranged in the sample chamber.

Further, according to the invention
- a conduit is provided between the sampling device and the sample chamber of the spectroscopic detection unit for introducing a sample taken at the sampling site of the sampling device into the sample chamber of the spectroscopic detection unit, heating and/or cooling means and a temperature control unit is provided in the spectroscopic detection unit for adjustment of a temperature of the sample chamber.

In the device for determination of a catalyst state in a chemical reactor according to the invention the catalyst state is not determined at a site inside the reactor chamber of the reactor. Instead, a sample of the fluid phase is taken from a particular sampling site inside the reactor and the process conditions, in particular the temperature of the fluid phase at that position, is determined.

The fluid sample is transferred to a spectroscopic unit situated outside the reactor. The spectroscopic unit comprises a sample chamber and the sample extracted from the reactor chamber is introduced into said sample chamber. Further, in the sample chamber can be arranged a catalyst as a sample. The catalyst can be chosen the same as the catalyst comprised in the reactor chamber of the reactor.

Further, the temperature in the reactor chamber at the sampling site of the sampling device is determined. The temperature can be determined for the fluid phase but can also be determined for the solid catalyst phase.

The spectroscopic detection unit is provided with heating and/or cooling means such that the sample chamber can be adjusted to the same temperature as determined in the reactor chamber of the reactor at the site of extraction of a sample.

Since the reaction conditions are the same at the site of extraction of the fluid sample in the reactor chamber of the reactor and at the sample chamber of the spectroscopic detection unit, at both sites the same steady state on the catalyst surface is adjusted. The catalyst provided in the reactor chamber at the site of extraction of the fluid sample experiences the same chemical potential as the catalyst provided in the sample chamber of the spectroscopic detection unit. Therefore, spectroscopic measurements made on the catalyst surface in the sample chamber of the spectroscopic detection unit correspond to spectroscopic measurements made at the site of extraction of the fluid sample in the reactor chamber of the reactor. Therefore, it is possible with the device according to the invention to determine the state of a catalyst provided inside a reactor chamber of a chemical reactor without having to conduct spectroscopic analysis inside the reactor chamber.

Since the state of the catalyst is determined outside of the reactor chamber in the sample chamber of the spectroscopic detection unit there is more freedom in the design of said spectroscopic detection unit. Devices for spectroscopic analysis can be used that have higher requirements with regard to space. This allows use of a wide range of spectroscopic methods since the sample chamber can be designed according to the needs of said spectroscopic method. It also becomes possible to use spectroscopic methods like electron paramagnetic resonance (EPR), nuclear magnetic resonance (NMR), X-ray diffraction (XRD), x-ray absorption spectroscopy (XAS), infrared spectroscopy (IR) as well as spectroscopic methods using visible or ultraviolet light, like UV-Vis spectroscopy, Raman spectroscopy, fluorescence spectroscopy, among others.

The device for determination of a catalyst state in a chemical reactor according to the invention comprises a reactor comprising a reactor chamber with at least one inlet for introducing a fluid phase into the reactor chamber and at least one outlet for draining off the fluid phase.

The reactor comprises a reactor chamber that can be filled with a sample, e.g. a catalyst sample. Suitable means can be provided in the reactor that allow filling of the reactor chamber with a catalyst phase. Such means can be e.g. a port that can be opened to allow access to the reactor chamber and that can be tightly closed to ensure impermeability of the port to the fluid phase under reaction conditions.

According to an embodiment, the reactor chamber can be cooled or heated to adjust a reaction temperature inside the reactor chamber. For this purpose means for heating or cooling may be provided at or inside the reactor chamber. For heating may be provided e.g. an electrical heating, e.g. a heating coil placed close to the reactor chamber and e.g. surrounding the outer wall of the reactor chamber. According to another embodiment, the means for heating, e.g. a heating coil, is placed inside the reactor chamber. The electric heating is connected to a corresponding electric power source. According to a further embodiment the reactor chamber is surrounded at least partially by a heating or cooling jacket through which a heating or cooling medium is flown. As a heating medium can be used e.g. water, oil, or a salt mixture. For cooling can be provided e.g. one or several channels provided inside the reactor wall, or e.g. a cooling jacket, through which a cooling medium, e.g. water or a salt mixture, can be flown.

According to an embodiment heating at or inside the reactor chamber might also be accomplished by thermal radiation emitted by radiative heaters, e.g. halogen lamps, and guided to the reactor chamber. Mirrors, e.g. elliptic mirrors, can be used to direct and concentrate the thermal radiation onto the reactor and the reactor chamber. A temperature of more than 1000° C. therefore can be achieved in the reactor chamber.

Devices for adjusting or keeping a temperature at a particular level, e.g. a thermostat, may be provided according to an embodiment, to keep temperature in the reactor chamber at a desired level.

According to an embodiment, the reactor is designed as a flow reactor through which is transported a fluid medium, i.e. a gaseous or liquid phase, e.g. reaction components or inert components, like a carrier gas. The reactor has according to an embodiment the form of a packed-bed reactor or is a column reactor.

At least one inlet for introducing a fluid phase into the reactor chamber and at least one outlet for draining off the fluid phase from the reactor chamber is provided. Inlet and outlet are provided at opposite ends of the reactor chamber according to an embodiment. According to an embodiment the at least one inlet is positioned such that the fluid phase will enter a catalyst bed positioned in the reactor chamber at a front end of the catalyst bed.

Depending e.g. on the size of the reactor chamber and the flow rate of the fluid medium inside the reactor chamber a single inlet for the fluid phase may be provided. However, according to another embodiment, more than one inlet can be provided, e.g. more than one or more than two. The number of inlets can be selected according to the needs of the particular reaction to be performed and can be chosen e.g. smaller than 10, according to another embodiment smaller than 5. In a situation wherein several components have to be introduced into the reactor chamber to react with each other, the components can be introduced separately into the reactor chamber through separate inlets.

Devices for distributing the fluid flow in the reactor chamber can be provided according to an embodiment such that a uniform flow of the fluid phase through the reactor chamber is achieved.

A single outlet can be provided for draining off the fluid phase from the reactor chamber. However, according to an embodiment, it is also possible to provide more than one outlet, e.g. 2 to 5 outlets.

Devices for forcibly introducing the fluid medium into the reactor chamber or for discharging it therefrom may be provided according to an embodiment. A suitable device for introducing the fluid medium into the reactor chamber or for discharging it therefrom is e.g. a pump for pumping a gaseous or liquid medium. However, according to an embodiment it is also possible to provide at least one pressurized container, e.g. a gas bomb as used e.g. in a laboratory, and a valve for adjusting pressure inside the reactor chamber.

If the fluid medium comprises several components, e.g. several gases or several immiscible liquids that form several liquid phases, mixing devices can be provided for mixing the components to obtain a homogeneous fluid medium to be introduced into the reactor chamber.

Control devices for adjusting and controlling the flow of the fluid medium are provided according to an embodiment. An exemplary device is a computer connected to a valve or a pump to control the flow of the fluid medium by adjusting the opening of the valve or the delivery rate of the pump.

The reactor and the wall of the reactor chamber are made of a suitable material. A suitable material is a material that is stable or inert under reaction conditions occurring in the reactor chamber. A suitable material is e.g. a metal, e.g. steel. However, also other materials can be used, e.g. ceramics or glass. A suitable material for the reactor is e.g. stainless steel.

The reactor and the reactor chamber can basically have every desired size. Preferably the reactor takes the form of a micro-reactor. A suitable size according to an embodiment is a size wherein the reactor chamber can be filled completely with about 1 to 20 g of a sample, e.g. a powder sample or a granulated sample. According to an embodiment, the reactor chamber has a length in a longitudinal direction of at least 10 mm, according to a further embodiment of at least 20 mm, according to a further embodiment of at least 30 mm, according to a further embodiment of at least 40 mm, and according to a further embodiment of at least 50 mm. According to a further embodiment, the reactor chamber has a length in a longitudinal direction of less than 200 mm, according to a further embodiment of less than 150 mm, according to a further embodiment of less than 100 mm, and according to a further embodiment of less than 75 mm.

The longitudinal direction is understood to be that direction in which the reactor chamber has its largest elongation and which corresponds to the direction of flow of the fluid medium.

According to a further embodiment, the reactor chamber has a dimension in a transversal direction, i.e. in a direction perpendicular or orthogonal to the longitudinal direction, of less than 50 mm, according to a further embodiment of less than 20 mm, according to a further embodiment of less than 10 mm, according to a further embodiment of less than 8 mm, and according to a further embodiment of less than 6 mm. According to an embodiment, the reactor chamber has a dimension in a direction perpendicular to the longitudinal direction of more than 1 mm, according to a further embodiment of more than 2 mm, according to a further embodiment of more than 3 mm and according to a further embodiment of 4 mm.

The cross section of the reactor chamber can have the form of a circle but according to another embodiment can also have e.g. a square, rectangular, oval or ellipsoidal form. Other cross sections are possible. According to a preferred embodiment the reactor chamber has a circular cross section.

Further, the device for determination of a catalyst state in a chemical reactor is comprising a sampling capillary comprising an sampling orifice for collecting a fluid sample inside the reactor chamber, wherein the sampling capillary is introduced into the reactor chamber and the sampling orifice is arranged inside the reactor chamber.

By use of a sampling device a sample of the fluid phase can be extracted from the reactor chamber.

The sampling device can be a side exit of the reactor chamber. Such side exits can be arranged at defined positions of the reactor chamber, e.g. along the longitudinal direction of the reactor chamber. Samples of the fluid phase can be extracted through such side exits. It is then possible to obtain a reactor profile of a particular parameter.

According to an embodiment, the sampling device is a sampling capillary comprising a sampling orifice. The sampling capillary is introduced from the outside of the reactor chamber into the interior of the reactor chamber. The fluid sample enters the interior space of the sampling capillary through the sampling orifice and then travels along the interior space of the sampling capillary to be guided to an open end of the sampling capillary.

The sampling capillary, according to an embodiment, is open at least on one end. According to a further embodiment, the sampling capillary has an opening at each of its terminal ends. One of the open ends can be used to extract the fluid sample from the interior space of the capillary. Such open end then can be connected to a conduit for directing the fluid sample to an analytical device.

The sampling capillary preferably has a straight linear shape. However, it is also possible to use a sampling capillary of different shape, e.g. a curved shape.

According to an embodiment, the sampling capillary is rotatable along its longitudinal axis. An actuator may be provided for rotating the sampling capillary along its longitudinal axis. A controller may be provided to control rotation movement of the sampling capillary.

According to an embodiment, the sampling capillary traverses the reactor chamber. According to an embodiment, the sampling capillary traverses the reactor in a longitudinal direction. The sampling capillary then is arranged parallel to the flow of the fluid phase. The sampling capillary, according to an embodiment, enters the reactor chamber at one longitudinal end of the chamber and exits the reactor chamber at the other longitudinal end of the reactor chamber arranged at the opposite side of the reactor chamber.

A corresponding port for introducing the sampling capillary into the reactor chamber can be provided in the wall of the reactor chamber. In an embodiment wherein the sampling capillary traverses the reactor chamber a port is provided on opposite sides of the reactor chamber. Preferably, the ports are provided at opposite ends of the reactor chamber when seen in a longitudinal direction. The ports provide a gastight opening for receiving the sampling capillary.

The sampling capillary preferably has an inner diameter of less than 3 mm, according to a further embodiment of less than 2 mm, according to a still further embodiment of less than 1 mm. According to an embodiment, the sampling capillary has an inner diameter of more than 50 μm, according to an embodiment of more than 100 μm and according to a still further embodiment of more than 150 μm.

The wall thickness of the sampling capillary, according to an embodiment, is selected smaller than 1 mm, according to an embodiment is selected smaller than 800 μm, according to a still further embodiment is selected smaller than 500 μm. According to an embodiment, the wall thickness of the sampling capillary is selected larger than 50 μm, according to an embodiment is selected larger than 100 μm and according to a still further embodiment is selected larger than 150 μm.

The sampling capillary preferably is made of a material that is inert under the reaction conditions present in the reactor chamber. According to a preferred embodiment, the sampling capillary is made of steel, in particular stainless steel. Steel provides sufficient rigidity to the sampling capillary such that a danger of breakage is minimized.

The material of the sampling capillary, however, is not restricted to steel. Other suitable materials can be used as well.

According to an embodiment, the sampling capillary is made of a material transparent to electromagnetic radiation. According to an embodiment, the material is transparent to UV/VIS, NIR and/or IR-radiation. A suitable material for the sampling capillary is e.g. fused silica.

The sampling capillary has a sampling orifice for collecting a fluid sample from the reactor chamber. The fluid sample may be transported through the capillary by a pressure gradient between the reactor chamber and the end of the capillary situated outside the reactor chamber.

According to a preferred embodiment, the orifice for collecting a fluid sample is situated at a sidewall of the sampling capillary, preferably distant from an end of the sampling capillary. The diameter of the orifice depends on the size of the sampling capillary and preferably is less than 200 μm, according to an embodiment is less than 150 μm and according to a further embodiment is less than 150 μm. According to an embodiment the diameter of the sampling orifice is more than 5 μm, according to an embodiment is more than 10 μm and according to a still further embodiment is more than 20 μm. According to an embodiment, the diameter of the sampling orifice is selected within a range of 5 to 100 μm.

According to an embodiment, the sampling capillary is shiftable in a longitudinal direction of the reactor chamber. An actuator can be provided for shifting the sampling capillary. Further, a controller may be provided for controlling actuator and the movement of the sampling capillary.

According to an embodiment, the distance between an end of the sampling capillary and the orifice located in the sidewall of the sampling capillary is selected such that the end of the sampling capillary remains seated within the port provided in the reactor wall when the orifice is in a position corresponding to the maximum deflection of the sampling capillary.

Further, at least one temperature-sensitive sensor is arranged at the sampling orifice for detecting a temperature of a fluid phase and/or a solid phase at the site of the sampling orifice.

Depending on the type of temperature-sensitive sensor provided, it is possible to obtain information on the temperature of the sample, e.g. a catalyst, i.e. on the stationary phase, or on the temperature of the fluid phase, i.e. the gaseous or liquid phase that forms a mobile phase.

By use of a thermocouple the temperature of the fluid phase can be determined if the fluid phase is in direct contact with the thermocouple.

By use of a pyrometer fiber to collect thermal radiation, the thermal radiation emitted from the sample inside the reactor chamber, e.g. from the surface of a catalyst, can be collected and the temperature of the solid phase can be calculated therefrom.

The temperature-sensitive sensor can be arranged in the reactor chamber in such manner that the temperature-sensitive part of the sensor is in close relationship with the sampling orifice of the sampling capillary.

The temperature-sensitive sensor can e.g. be arranged side-by-side with the sampling capillary such that the temperature-sensitive part of the temperature-sensitive sensor is arranged at the sampling orifice.

According to a preferred embodiment, the temperature-sensitive sensor is arranged inside the sampling capillary. The tip of the temperature-sensitive sensor is arranged at the sampling orifice, such that fluid phase entering the sampling capillary through the sampling orifice gets in intense contact with the temperature-sensitive sensor. The temperature-sensitive sensor is connected to a suitable control unit to calculate the temperature determined by the temperature-sensitive sensor.

According to such embodiment, the thermocouple or the pyrometer fiber is introduced into the sampling capillary. The thermocouple or the pyrometer fiber is then protected against impact exerted e.g. by a sample provided inside the reactor chamber.

According to a further embodiment, the thermocouple or the pyrometer fiber is combined with the sampling capillary having an orifice in its side wall and having an opening at each of its distal ends. The thermocouple or the pyrometer fiber is introduced from one open distal end of the sampling capillary whereas the opposite open distal end of the sampling capillary is used to transport a fluid sample collected inside the reactor chamber to the outside of the reactor for further processing and analysis.

However, it is also possible according to an embodiment to introduce the thermocouple or the pyrometer from an open end of the sampling capillary and to use the same end for extracting the fluid sample taken through the sampling orifice.

The other end of the sampling capillary may be closed or, according to another embodiment, may be open.

The tip of the thermocouple or the pyrometer fiber is preferably placed at the place of the orifice such that a temperature of the sample or of the fluid phase can be determined at the same place where samples from the fluid phase are collected inside the reactor chamber.

Further, according to the invention, a spectroscopic detection unit is provided and is arranged outside the reactor. Said spectroscopic unit comprises a sample chamber for arranging a sample therein and a spectroscopic analysis device for obtaining spectroscopic data on the sample arranged in the sample chamber.

The spectroscopic detection unit comprises a sample chamber for arranging a sample therein. Such sample preferably corresponds to a small amount of the same catalyst as provided in the reactor chamber of the reactor.

The sample chamber serves as measuring cell for obtaining spectroscopic information by a suitable spectroscopic analysis method. At the same time the sample chamber serves as a small reactor for performing a chemical reaction.

The sample chamber is provided with an inlet and an outlet. The inlet of the sample chamber is connected to the end of the sampling capillary such that a fluid sample taken through the sampling orifice of the sampling capillary can be transferred into the sample cell. The outlet can be connected e.g. to a further analytic instrument, e.g. a gas chromatograph or a high performance liquid chromatography device for further analysis of components present in the sample chamber.

The sample chamber is made of a material that is inert under the reaction conditions occurring inside the sample chamber. A suitable material for the sample chamber is e.g. steel, in particular stainless steel. Other materials, however, may also be feasible, e.g. ceramics, glass, quartz, fused silica, sapphire, salts, e.g. potassium bromide, etc.

According to an embodiment, the sample chamber is provided with an opening that can be opened and closed in a gastight manner. Through the opening a small amount of catalyst can be introduced into the sample chamber.

The size of the sample chamber can be selected according to the needs of the analytical method used. Preferably, the size of the sample chamber is selected small such that errors in measurement of spectroscopic data are minimized. According to an embodiment, the size of the sample chamber is selected smaller than 5 ml, according to a further embodiment is selected smaller than 1 ml, and according to a further embodiment is selected smaller than 500 μm. According to an embodiment, the size of the sample chamber can be selected larger than 10 μm, according to an embodiment larger than 100 μm and according to a still further embodiment larger than 250 μm.

The shape of the sample chamber can be chosen according to the needs of a particular spectroscopic analysis method chosen. A suitable shape is e.g. a spherical shape or a cylindrical shape. Other shapes, however, are also possible.

The inlet and outlet of the sample chamber are arranged at opposite sides of the sample chamber, according to an embodiment.

The sample chamber can be equipped with heating or cooling means, according to an embodiment. Further, means for determination of a temperature, in particular of the temperature of the fluid phase can be provided according to an embodiment. Control means can be provided that are connected to the means for determination of a temperature and to the heating or cooling means to adjust a temperature within the sample chamber.

In particular, the control means are connected to the temperature-sensitive sensor arranged at the sampling orifice for detecting a temperature of a fluid phase and/or a solid phase at the site of the sampling orifice. This allows adjustment of a temperature of the sample chamber, or in other words of the fluid phase present in the sample chamber, to the temperature of a fluid phase determined at the site of the sample orifice of the sampling capillary provided in the reactor chamber of the reactor, in particular fixed-bed reactor.

Accordingly, heating and/or cooling means and a temperature control unit is provided in the spectroscopic detection unit for adjustment of a temperature of the sample chamber.

According to an embodiment, mixing means can be provided in the sample chamber. This allows homogenization of the reaction mixture within the sample chamber.

A conduit is provided between an open end of the sampling capillary and the inlet of the sample chamber of the spectroscopic detection unit for introducing a sample taken at the sampling orifice into the sample chamber of the spectroscopic detection unit.

The conduit can be made of any suitable material that is inert to the fluid phase. A suitable material is e.g. glass, quartz, metal, like steel, in particular stainless steel, and plastic polymers.

According to an embodiment, the sample chamber is provided with at least one window transparent to radiation used for spectroscopic analysis by the spectroscopic analysis device.

The material for the window is chosen according to the spectroscopic method used and is determined by the wavelength of the radiation.

According to an embodiment, fused silica, glass, sapphire or quartz is used as material for the window. Such materials are suitable when using electromagnetic radiation in a range covered by infrared, near infrared and ultraviolet/visible radiation. Preferably, a material transparent to radiation of a wavelength within a range of about $10^{-7}$ to $10^{-3}$ m is used for the window.

If infrared radiation is used to irradiate the sample in the sample chamber of the spectroscopic detection unit, zinc selenide, potassium bromide or silicon can be used as a material for the window. When using X-rays for analyzing the sample, beryllium, glassy carbon or a silicon crystal can be used as a material for the window.

According to an embodiment, the sample chamber comprises a single window. According to a further embodiment, the sample chamber comprises two windows. Two windows can be suitable, if e.g. the spectroscopic method is used in transmission or reflection.

In an embodiment, in which the reactor chamber comprises more than one window, the dimensions of the window may be the same or can be different for the individual windows.

According to this embodiment, the sample chamber is equipped with at least one window transparent for a radiation for irradiating a sample situated inside the sample chamber. According to an embodiment, a window is understood to be transparent for a radiation if the radiation after passing the window has at least 20%, according to an embodiment at least 50% and according to a further embodiment has at least 80% of the intensity of the incident radiation. A window having low transmissivity for radiation is e.g. used for X-ray diffraction. Such window may have a transmissivity as low as 20%, i.e. the radiation has only 20% of the intensity of the incident radiation after passing the window. To obtain a sufficient signal quality a longer measurement time can be chosen. For radiation in the visible range materials with higher transmissivity are available. Here a transmissivity of at least 80% can be achieved. According to an embodiment, the intensity of the radiation after passing the window is less than 100%, according to a further embodiment less than 98%, according to a further embodiment less than 95%, and according to a further embodiment less than 90% of the intensity of the incident radiation.

According to an embodiment, the reactor and the sampling capillary are movable relative to each other. This allows to take fluid samples inside the reactor chamber at several positions inside the reactor chamber. A reaction profile then can be obtained.

Preferably, the reactor and the sampling capillary can be shifted relative to each other in a longitudinal direction. The sampling capillary may be e.g. arranged following a longitudinal axis of the reactor chamber. By taking samples of the fluid phase at various positions of the sampling orifice of the sampling capillary, a spatially resolved profile of reaction parameters can be obtained.

According to a first embodiment, the reactor is arranged stationary and the sampling capillary can be shifted. An actuator then can be provided to shift the sampling capillary in a controlled manner such that the position of the sampling orifice within the reactor chamber is known. The movement of the capillary can be controlled with high precision by provision of a corresponding controller connected e.g. to the actuator.

According to an embodiment, the sampling capillary is guided in a liner, e.g. a stainless steel liner. The length of the liner is selected to allow a secure guidance of the sampling capillary and to avoid deflection of the sampling capillary when sliding the capillary back and forth in a longitudinal direction. The liner preferably also acts as seal such that no pressure losses are caused.

According to an embodiment, the length of the liner is at least 30 mm and is selected according to a further embodiment within a range of 50 to 200 mm. The inner diameter of the liner is selected such that the sampling capillary fits neatly into the liner still allowing longitudinal movement of the capillary. The liner is fixed to a suitable support to allow relative movement of capillary and liner. High viscous grease may be used to fill the gap between liner and capillary and to alleviate sliding of the capillary.

According to an embodiment, two liners are used each mounted to a suitable support. Between both liners is left an open space and this space is located in a reservoir for high viscous grease. When the sampling capillary is moved along its longitudinal axis, its outer surface picks up a thin grease layer. The annular gap between the capillary and the liner has a width of few micrometers, preferably less than 50 $\mu m$, according to an embodiment of less than 40 $\mu m$. Even at high operation pressure in the reaction chamber the high viscous grease therefore will not be squeezed through the annular gap. On the other hand, the grease allows slow movement of the capillary with minimum force as the pressure difference exerts only small forces.

According to a second embodiment, the sampling capillary is arranged stationary and the reactor can be shifted.

In such embodiment the reactor may be placed e.g. on a moveable platform, which is e.g supported on rails. An actuator is provided that can shift the table and the reactor mounted thereon in a longitudinal direction.

A controller may be provided to control longitudinal movement of the reactor.

As described above for the first embodiment, liners may be provided to allow secure guidance of the sampling capillary. Reference is made to the first embodiment for details of the liner.

According to an embodiment, the temperature-sensitive sensor has a fiber form and is arranged inside the sampling capillary wherein the tip of the fiber is arranged at the sampling orifice.

The temperature-sensitive sensor having a fiber form can be according to a further embodiment a thermocouple for determination of a temperature inside the reactor chamber or a pyrometer fiber to collect and guide thermal radiation to a detector outside of the reactor for temperature measurement.

According to an embodiment the thermocouple or the pyrometer fiber is introduced into the sampling capillary. The thermocouple or the pyrometer fiber is then protected against impact exerted e.g. by a sample provided inside the reactor chamber.

According to this embodiment, the thermocouple or the pyrometer fiber is situated inside the sampling capillary having an orifice in its side wall and the tip of the thermocouple or the pyrometer fiber is arranged at the sampling orifice.

The thermocouple or the pyrometer fiber can, according to an embodiment, be introduced from one open distal end of the sampling capillary whereas the opposite open distal end of the sampling capillary is used to transport a fluid sample collected inside the reactor chamber to the outside of the reactor for transfer into the sample chamber of the spectroscopic detection unit.

The tip of the thermocouple or the pyrometer fiber is preferably placed at the place of the orifice such that a temperature of the sample or of the fluid phase can be determined at the same place where samples from the fluid phase are collected inside the reactor chamber.

As described above, various spectroscopic methods can be used to analyze a catalyst provided in the sample chamber under in situ reaction conditions as experienced inside the reactor chamber of the reactor.

By the spectroscopic method the sample arranged in the sample chamber is irradiated such that spectroscopic information is obtained.

Irradiation of a sample by a radiation is understood to be any interaction between the sample and the radiation. The radiation can be absorbed by the sample and an absorption spectrum can then be detected. According to a further embodiment, the sample is irradiated by a radiation and then emits radiation of a wavelength different to the wavelength of the radiation used for irradiating the sample. An emission spectrum can then be detected. According to a further embodiment Raman-spectroscopy is used for analysis of the sample, i.e. radiation scattered by the sample is collected for analysis. It is also possible that the radiation is reflected or diffracted by the sample, e.g. when using X-ray-diffraction as a method for analyzing the sample. The radiation used for analysis of the sample inside the reactor chamber is according to an embodiment electromagnetic radiation.

According to an embodiment, the spectroscopic analysis device is an infrared-spectrometer.

Preferred ranges for the wavelength of radiation emitted by the radiation source are 2.5 $\mu m$ to 25 $\mu m$ when using infrared spectroscopy for analysis, 760 to 2500 nm, when using NIR-spectroscopy (NIR=near infrared) for analysis.

According to a further embodiment, the infrared spectrometer is a diffuse reflection mode infrared spectrometer.

According to a further embodiment, the spectroscopic analysis device is a XRD-spectrometer. When using X-ray diffractometry for analysis of a sample the radiation emitted by the radiation source preferably has a wavelength in a range of 1 μm to 10 nm.

According to a further aspect, the invention is directed towards a method for detecting a catalyst state under in situ reaction conditions, wherein:

a reactor chamber is provided comprising a solid catalyst and a mobile fluid phase passing through said reactor chamber;

a fluid sample is taken inside the reactor chamber at an extraction site, the temperature of the fluid phase at the extraction site is determined, the fluid sample is transferred to a sample chamber of a spectroscopic detection unit, wherein a catalyst sample of the same solid catalyst comprised in the reactor chamber is provided in the sample chamber;

the temperature of the fluid phase in the sample chamber of the spectroscopic detection unit is adjusted to the temperature of the fluid phase at the extraction site, and spectroscopic data of the solid catalyst provided in the sample chamber are acquired.

In a first step of the method according to the invention, a reactor is provided comprising a reactor chamber.

A solid catalyst is placed inside the reactor chamber. The catalyst may take any desired shape.

According to an embodiment the catalyst is provided in powdery or granular form. The catalyst, according to a further embodiment, can also be provided in the form of a structured solid e.g. a monolith. The catalyst should be provided in a form that allows a fluid flow, in particular a gas flow, without build-up of a too high counter-pressure.

In an embodiment, in which the solid catalyst is provided in a particulate form, the size of the particles according to an embodiment is at least 100 μm, according to a further embodiment is at least 150 μm. According to a further embodiment, the size of the particles is less than 10 mm, according to a still further embodiment is less than 5 mm. The catalyst particles can have every shape and can e.g. take a spherical form or a granular form, when using e.g. a granulate. However, the catalyst particles can also have a shaped form as known e.g. from catalyst technology.

Basically every solid catalyst sample can be analyzed by the method according to the invention. The catalyst can be every catalyst that catalyzes e.g. a chemical reaction or a biochemical reaction. In heterogeneous catalysis the reaction usually proceeds at the surface of the catalyst.

A mobile fluid phase is then flown through the reactor chamber and is passing the solid catalyst to get in intense contact with the same. The mobile fluid phase is formed by a fluid medium.

The fluid medium may be gaseous or liquid. It is also possible that the fluid medium concurrently comprises a liquid and a gaseous phase or two immiscible liquid phases. It is also possible that the fluid medium is in a supercritical state. The fluid phase comprises at least one compound that acts as a reactant in a reaction catalyzed by the catalyst. The fluid phase may comprise inert media that act e.g. as diluents.

The flow rate of the fluid medium is adjusted according to the parameters of the reactor and the reaction catalyzed by the catalyst.

Further, the temperature of the fluid medium is adjusted. The temperature of the fluid medium corresponds to the temperature inside the reactor chamber.

The temperature inside the reactor chamber can be adjusted according to the reaction conditions specific for a particular catalyst and the reaction catalyzed by the catalyst.

Further, a pressure can be adjusted in the reactor chamber. The pressure is adjusted according to the reaction catalyzed by the catalyst.

The temperature inside the reactor chamber may be constant or according to a further embodiment may have a temperature gradient in at least one spatial direction, e.g. in the longitudinal direction of a fluid stream passing through the reactor chamber. According to a further embodiment a temperature gradient may also exist in a direction orthogonal to the longitudinal direction.

The reactor and the reaction taking place in the reactor may run until reaction conditions in the reactor chamber have been stabilized.

A fluid sample is then taken inside the reactor chamber at an extraction site.

According to an embodiment, a continuous flow of a fluid sample may be taken inside the reactor chamber. For taking the fluid sample a sampling capillary as described above with the device for determination of a catalyst state in a chemical reactor may be used.

The flow rate of the continuous flow of a fluid sample extracted from the reactor chamber can be suitably selected. The flow rate may be e.g. determined by the pressure inside the reactor chamber and the size of the sampling orifice. According to an embodiment, the flow rate of the fluid medium is selected within a range of 1 to 100 ml/min, according to a further embodiment within a range of 5 to 20 ml/min. Further, the temperature of the fluid phase at the extraction site is determined.

As described above, the temperature of the fluid phase, in particular the temperature at the sampling orifice of the sampling capillary can be determined by use of a temperature-sensitive fiber that preferably is arranged inside the sampling capillary wherein the tip of the thermosensitive fiber is arranged at the site of the sampling orifice.

The thermosensitive fiber is preferably a thermocouple. According to a further embodiment, the thermosensitive fiber is a pyrometer fiber.

The fluid sample is transferred to a sample chamber of a spectroscopic detection unit.

Preferably, the fluid sample is transferred from the sampling capillary to the sample chamber by a conduit. The conduit is connected with its one end to the sampling capillary and with its opposite end to the sample chamber.

Preferably, a continuous flow of the fluid phase is established within the sample chamber.

In the sample chamber is provided a catalyst sample of the same solid catalyst comprised in the reactor chamber of the reactor. The amount of the catalyst sample can be selected small. According to an embodiment, the amount of catalyst sample is selected larger than 5 mg, according to a further embodiment is selected larger than 100 mg, and according to a further embodiment is selected larger than 250 mg. According to a further embodiment, the amount of catalyst sample is selected smaller than 5 g, according to a further embodiment is selected smaller than 1 g, and according to a further embodiment is selected smaller than 500 mg.

The catalyst sample can have every suitable shape and can be provided e.g. in the form of a powder or in a granular form.

The shape of the catalyst sample can be the same as the shape of the solid catalyst provided in the reactor chamber of the reactor. However, the shape of the catalyst sample can be also be selected different from the shape of the solid catalyst provided in the reactor chamber of the reactor. E.g. the solid catalyst may be provided in the reactor chamber of the reactor in granular form, whereas the catalyst sample provided in the sample chamber of the spectroscopic detection unit may have the form of a powder.

The temperature of the fluid phase in the sample chamber of the spectroscopic detection unit is then adjusted to the temperature of the fluid phase at the extraction site.

After the fluid phase in the reactor chamber has been separated from the catalyst by taking a fluid sample through the sampling orifice, the reaction catalyzed by the catalyst basically stops immediately. The composition of the mixture of reactants comprised in the fluid phase therefore basically remains as it is during transportation of the fluid sample from the sampling orifice of the sampling capillary to the sample chamber of the spectroscopic detection unit. After having entered the sample chamber, the fluid sample contacts the catalyst provided in the catalyst chamber. Since the catalyst now is again in contact with the fluid phase, the reaction within the fluid phase starts again. By adjusting the temperature of the fluid phase to the temperature of the fluid phase as determined at the site of the sampling orifice, the reaction conditions in the reactor chamber at the site of the sampling orifice correspond to the reaction conditions experienced in the sample chamber of the spectroscopic detection unit. Any spectroscopic analysis performed on the catalyst and the fluid phase in the sample chamber of the spectroscopic detection unit therefore is equivalent to a spectroscopic analysis performed in the reactor chamber of the reactor at the site of the sampling orifice. Results obtained by the spectroscopic analysis performed in the sample chamber of the spectroscopic detection unit therefore can be assigned to the site of the sampling orifice situated in the reactor chamber of the reactor.

The catalyst experiences the same chemical potential in the sample chamber as in the reactor chamber at the site of the sampling orifice.

According to the invention therefore spectroscopic data of the solid catalyst provided in the sample chamber are acquired and the results can be considered equivalent to results obtained directly at the site inside the reactor where the sample has been taken.

Since the spectroscopic analysis has not to be performed inside the reactor chamber but can be performed outside the reactor at a spectroscopic detection unit a lot more freedom in designing the spectroscopic analysis device is available. No restrictions apply for the design of the measuring cell of the spectroscopic analysis device. Basically every material can be used for building the measuring cell such that materials can be used that are transparent for the radiation used in the respective analytical method. Any radiation source can be used since e.g. it is not necessary to guide the radiation to a place distant form the place of the radiation source, e.g. a fiber, and, therefore, no problems occur due to absorption of the radiation during the transport through a transport medium.

The method according to the invention can be used to acquire reaction profiles within the reactor chamber. For this purpose a shiftable sampling capillary can be provided such that by shifting the shiftable sampling capillary, fluid samples can be taken at different sites within the reactor chamber.

According to such embodiment, a first sample of the fluid phase is taken at a first site inside the reactor chamber and first spectroscopic data of the solid catalyst provided in the sample chamber are acquired; and at least one further sample of the fluid phase is taken at at least one further site in the reactor chamber and further spectroscopic data of the solid catalyst provided in the sample chamber are acquired.

In such embodiment, the sampling capillary can be adjusted at a first position in the reactor chamber. A fluid sample is taken at that first position. The fluid sample can be taken through a sampling orifice of the sampling capillary as described further above. Preferably the sample is taken continuously such that a continuous sample flow is obtained through the sampling capillary. Further, the temperature of the fluid phase is determined at the place where the sample is taken, in particular at the sampling orifice. The sample is transported through the interior space of the sampling capillary and, if present, through a conduit to reach the sample chamber of the spectroscopic detection unit. The temperature of the sample chamber is adjusted to the temperature determined at the site of sample taking in the reactor chamber. In the sample chamber is provided a sample of the same catalyst as provided in the reactor chamber of the reactor. After equilibration of the system spectroscopic data of the solid catalyst provided in the sample chamber are acquired by the method used by the spectroscopic detection unit.

The sampling capillary is then shifted to a further position within the reactor chamber and a further sample is taken from the reactor chamber. The sample is transferred to the sample chamber of the spectroscopic detection unit and further spectroscopic data are obtained as described above.

The process of shifting the sampling capillary to a further position, taking a sample and analyzing the sample in the spectroscopic detection unit is repeated such that a spatially resolved spectrum of spectroscopic data is obtained.

As explained above, by the method according to the invention, the chemical potential experienced by the catalyst in the sample chamber is adjusted to the chemical potential experienced by the same catalyst in the reactor chamber of the reactor at the site where the sample is taken.

According to an embodiment, a sampling capillary comprising a sampling orifice in its sidewall is used for extraction of a sample. According to an embodiment, the sampling capillary is rotated around its longitudinal axis during sample taking. The rotation can be performed in a continuous or a stepwise manner. Since the catalyst bed in the reactor chamber may be inhomogeneous at the sampling site due to the use of larger catalyst particles averaging of the reaction conditions is achieved by rotating the sampling capillary.

According to an embodiment, the pressure of the fluid phase inside the sample chamber is adjusted to the pressure of the fluid phase inside the reactor chamber, in particular at the site where the sample is taken. Means for adjusting and controlling the pressure of the fluid phase can be provided. Provision of such means is advantageous e.g. if a gaseous fluid phase is used.

In the method according to the invention, spectroscopic data can be acquired by any spectroscopic method. Basically any measuring cell known for the particular spectroscopic analysis method can be modified to be used in the method according to the invention by providing means for adjusting temperature and, if required, pressure, and by designing the measuring cell as a flow cell.

Suitable methods are e.g. electron paramagnetic resonance, EPR, nuclear magnetic resonance (NMR), X-ray diffraction (XRD), x-ray absorption spectroscopy (XAS), infrared spectroscopy (IR) as well as spectroscopic methods using visible or ultraviolet light, like UV-Vis spectroscopy, Raman spectroscopy, fluorescence spectroscopy, among others.

According to an embodiment, the spectroscopic data are acquired by at least one of diffuse reflexion infrared spectroscopy and spatial XRD.

When X-rays are used for analysis of the sample by X-ray diffraction, synchrotron radiation, CuKα-radiation or Moka can be used according to an embodiment. When using X-ray diffractometry for analysis of a sample the radiation emitted by the radiation source preferably has a wavelength in a range of 1 μm to 10 nm.

When using infrared spectroscopy for analysis preferred ranges for the wavelength of radiation used for spectroscopic analysis are 2.5 μm to 25 μm, 760 to 2500 nm, when using NIR-spectroscopy (NIR=near infrared) for analysis.

Preferably, the method according to the invention is performed with a device as described above.

BRIEF DESCRIPTION OF THE FIGURES

The device for determination of a catalyst state in a chemical reactor as well as the method for detecting a catalyst state under in situ reaction conditions according to the invention will be described in further detail with reference to the accompanying figures, wherein shows.

DETAILED DESCRIPTION

Figure 1:
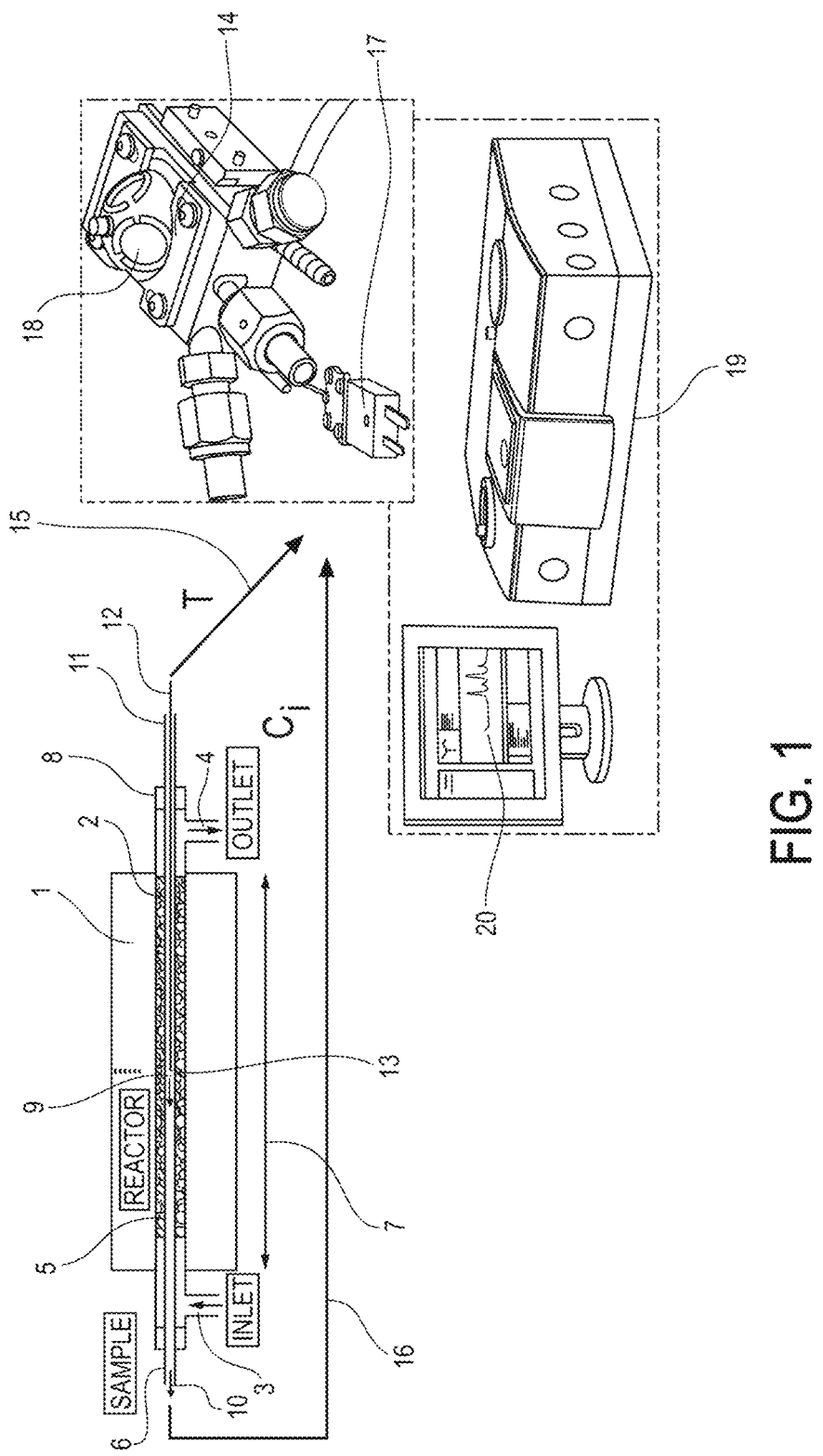
FIG. 1: a device for determination of a catalyst state in a chemical reactor wherein diffuse infrared reflexion is used as spectroscopic method.

In FIG. 1 is shown a reactor 1 comprising a reactor chamber 2. A fluid phase is introduced into reactor chamber 2 through inlet 3. The fluid phase passes through reactor chamber 2 to leave through outlet 4. In reactor chamber 2 is provided solid catalyst 5. While flowing through reactor chamber 2 the fluid phase interacts with solid catalyst 5 and components comprised in the fluid phase undergo chemical reactions. Reactor 1 can be heated or cooled by heating and cooling devices (not shown). A sampling capillary 6 is provided in reactor chamber 2 and can be shifted in a longitudinal direction as indicated by arrow 7. Sampling capillary is seated in bearings 8a, b. A sampling orifice 9 is provided in a sidewall of the sampling capillary 2 such that a sample of the fluid phase passing through reactor chamber 2 can enter the interior space of sampling capillary 2 to flow to an open terminal end 10 of sampling capillary 2. Through the open opposite terminal end 11 of sampling capillary 2 is introduced a pyrometer fiber 12. Fiber tip 13 of pyrometer fiber 12 is situated at sampling orifice 9 of sampling capillary 12. Fluid phase entering through sampling orifice 9 gets into intense contact with fiber tip 13 and, therefore, the temperature of the fluid phase can be determined. Fiber 12 is connected to a controller (not shown) for calculating the temperature as determined by pyrometer fiber 12 and to transfer the information on the temperature determined at sampling orifice 9 to a sample cell 14 through connection 15.

Terminal end 10 of sampling capillary 6 is connected to a conduit 16 which in turn is connected to sampling cell 14 such that a fluid sample taken through sampling orifice 9 can be transferred to sampling cell 14.

Sampling cell 14 is equipped with a heating device 17 for adjusting the temperature of sample cell 14 to the same temperature as determined at sampling orifice 9.

Sampling cell 14 is equipped with windows 18 transparent for infrared radiation. Infrared radiation enters sample cell 14 through window 18 and inclines on a catalyst sample provided in sampling cell 14. The incident IR-radiation is diffusively reflected on the catalyst surface and then, after passing windows 18 is collected by an IR-sensor (not shown).

Since the composition of the fluid phase collected through sampling orifice 9 is the same as the composition of the fluid phase as present in sample cell 14 and, further, the temperature inside sample cell 14 is the same as the temperature determined at sample orifice 9 the catalyst provided in sample cell 14 experiences the same chemical potential as the catalyst being present at the location of sampling orifice 9 in reactor chamber 2. Spectroscopic information on the catalyst as determined in sample cell 14 therefore is equivalent to spectroscopic information determined at the site of sampling orifice 9 within the reactor chamber 2.

For obtaining spectroscopic information at several sites inside reactor chamber 2, sampling capillary 6 can be shifted in a longitudinal direction. After placing sampling orifice 9 at a further position the system is equilibrated and then spectroscopic information is determined for the further position. The determination of spectroscopic information can be repeated for several positions of sampling orifice 9 such that a reactor profile can be obtained.

Sampling cell 14 is comprised in IR spectrometer 19 and spectroscopic information can be displayed e.g. on display 20.

Figure 2:
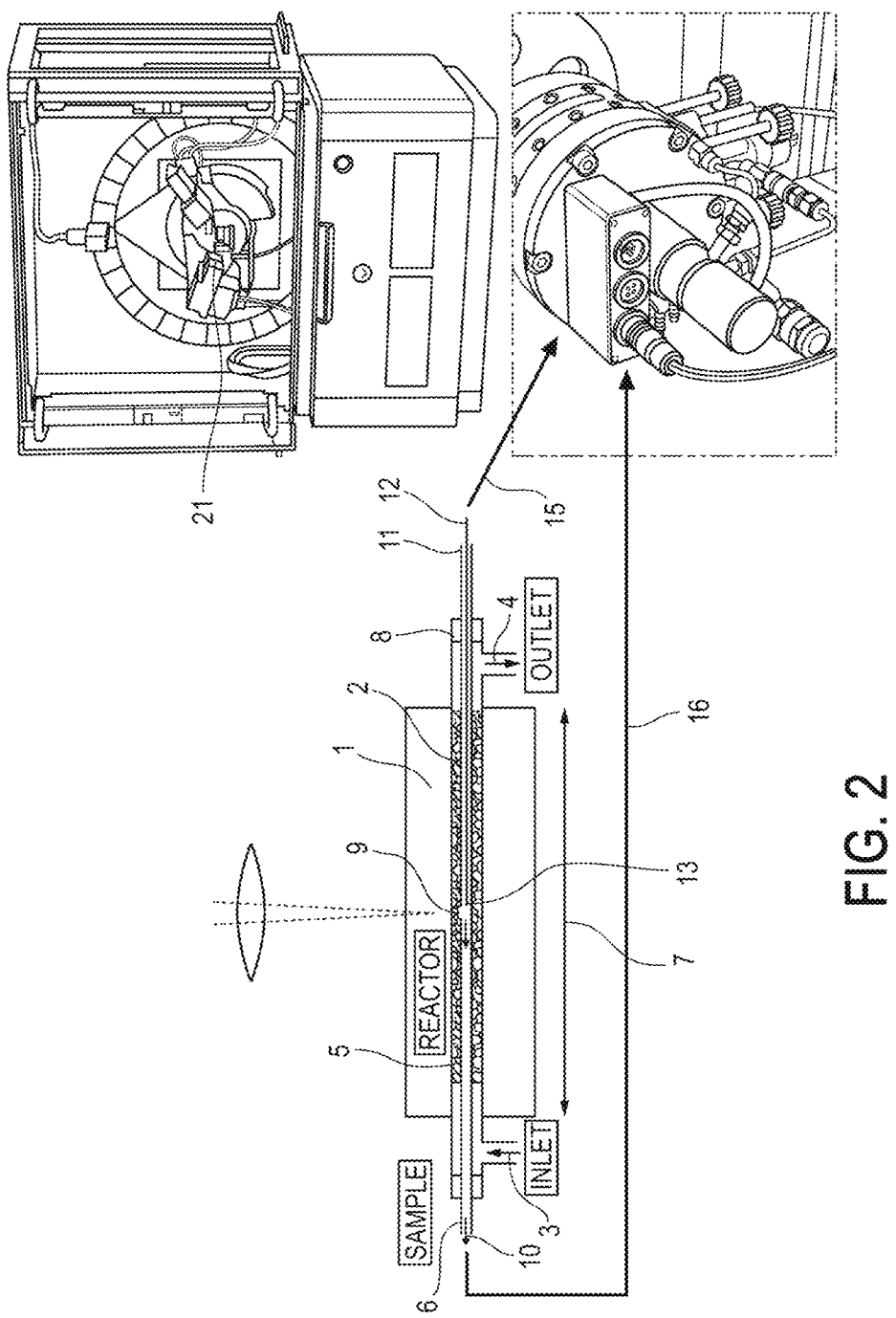
FIG. 2: a device for determination of a catalyst state in a chemical reactor wherein spatial XRD is used as spectroscopic method.

FIG. 2 basically corresponds to a setting as described with reference to FIG. 1. Instead of an IR cell for diffuse reflexion an X-ray diffractometer is used for obtaining spectroscopic information.

A window provided in X-ray diffactometer is transmissive for X-rays. An X-ray source is provided which emits an X-ray beam and can be moved on a segment of a circle. The X-ray beam interacts with sample to be diffracted and provided in sample cell. The diffracted parts of X-ray beam are collected in an X-ray detector that is movable on a segment of a circle. The reflexes collected by the X-ray detector may then be further processed by a corresponding evaluation unit (not displayed) and displayed by a suitable display unit (not displayed).

As described with reference to FIG. 1, a reactor 1 is provided with a reactor chamber 2. The reactor chamber 2 is filled with a catalyst bed 5. A sampling capillary 6 extends along a longitudinal direction of reactor chamber 2. Sampling orifice 9 is provided in a sidewall of sampling capillary 6 to extract a sample of the fluid phase from the reactor chamber at a particular sampling site.

In the embodiment shown in FIG. 2, reactor 1 is shiftable along a direction marked by arrow 7 and sampling capillary 6 remains stationary at a fixed position. By shifting reactor 1 fluid samples can be taken from reactor chamber at various positions along a longitudinal axis of the reactor. The fluid samples are transferred to the sample chamber of X-ray diffractometer 21. In the sample chamber of X-ray diffractometer 21 is provided a small amount of the same catalyst as provided in reactor chamber 2. Further, the temperature of the fluid phase at sampling orifice 9 is determined and the temperature of the sampling chamber of X-ray diffractometer 21 is adjusted to the same temperature. The catalyst provided in the sample chamber of X-ray diffractometer 21 therefore experiences the same chemical potential as the catalyst provided in reactor chamber 2 at the site of sampling orifice 9.

The invention claimed is:

1. A device for determination of a catalyst state in a chemical reactor, comprising:

the chemical reactor comprising a reactor chamber with at least one inlet for introducing a fluid phase into the reactor chamber and at least one outlet for draining off the fluid phase, a sampling device for collecting a fluid sample inside the reactor chamber, a temperature-sensitive sensor arranged at the sampling device for detecting temperature of the fluid phase and/or a solid phase at a site of the sampling device where the fluid sample is collected, wherein a spectroscopic detection unit arranged outside the reactor, said spectroscopic detection unit comprising a sample chamber for configured to arrange a solid catalyst sample therein and a spectroscopic analysis device for obtaining spectroscopic data on the catalyst sample arranged in the sample chamber, wherein the fluid phase, while flowing through reactor chamber is configured to interact with said solid catalyst and components comprised in the fluid phase are configured to undergo chemical reactions, a conduit is provided between sampling device and the sample chamber of the spectroscopic detection unit for introducing a fluid sample taken at the sampling device into the sample chamber of the spectroscopic detection unit, heating and/or cooling means and a temperature control unit are provided in the spectroscopic detection unit and are configured for adjustment of a temperature of the sample chamber.

2. A device according to claim 1, wherein the sampling device is a sampling capillary comprising a sampling orifice for collecting the fluid sample inside the reactor chamber, wherein the sampling capillary is introduced into the reactor chamber and the sampling orifice is arranged inside the reactor chamber.

3. A device according to claim 2, wherein the reactor and the sampling capillary are movably relative to each other.

4. A device according to claim 2, wherein the reactor is arranged stationary and the sampling capillary is slidably relative to the reactor.

5. A device according to claim 1, wherein the temperature-sensitive sensor has a fiber form.

6. A device according to claim 5, wherein the temperature-sensitive sensor is arranged inside the sampling capillary wherein a tip of the temperature-sensitive sensor having the fiber form is arranged at the sampling orifice.

7. A device according to claim 1, wherein the spectroscopic analysis device is an infrared-spectrometer.

8. A device according to claim 7, wherein the infrared spectrometer is a diffuse reflection mode infrared spectrometer.

9. A device according to claim 1, wherein the spectroscopic analysis device is an XRD-spectrometer.

10. A method for detecting a catalyst state under in situ reaction conditions, wherein a reactor chamber is provided comprising a solid catalyst and a mobile fluid phase passing through the reactor chamber, a fluid sample is taken inside the reactor chamber at a first extraction site, the temperature of the mobile fluid phase at the first extraction site is determined, the fluid sample is transferred to a sample chamber of a spectroscopic detection unit, wherein a catalyst sample of the solid catalyst comprised in the reactor chamber is provided in the sample chamber, the temperature of the mobile fluid phase in the sample chamber of the spectroscopic detection unit is adjusted to the temperature of the mobile fluid phase at the first extraction site, and spectroscopic data of the solid catalyst provided in the sample chamber are acquired, wherein the first sample of the mobile fluid phase is taken at the first extraction site inside the reactor chamber and the spectroscopic data of the solid catalyst provided in the sample chamber are acquired whilst the solid catalyst is in contact with the first sample of the mobile fluid phase; and at least one further fluid sample of the mobile fluid phase is taken at least one further extraction site in the reactor chamber and further spectroscopic data of the solid catalyst provided in the sample chamber are acquired whilst the solid catalyst is in contact with the one further fluid sample.

11. A method according to claim 10, wherein a pressure of the mobile fluid phase inside the sample chamber is adjusted to a pressure of the fluid phase inside the reactor chamber.

12. A method according to claim 10, wherein the spectroscopic data are acquired by diffuse reflection infrared spectroscopy.

13. A method according to claim 10, wherein the spectroscopic data are acquired by spatial XRD.

\* \* \* \* \*